US012761591B2

(12) United States Patent
Gon et al.

(10) Patent No.: US 12,761,591 B2
(45) Date of Patent: Oct. 13, 2026

(54) FIXING DEVICE AND IMAGE FORMING APPARATUS PROVIDED THEREWITH

(71) Applicant: KYOCERA Document Solutions Inc., Osaka (JP)

(72) Inventors: Shoko Gon, Osaka (JP); Yasuhito Okajima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/081,034

(22) Filed: Mar. 17, 2025

(65) Prior Publication Data

US 2025/0298350 A1 Sep. 25, 2025

(30) Foreign Application Priority Data

Mar. 22, 2024 (JP) ................................ 2024-046560

(51) Int. Cl.
*G03G 15/20* (2006.01)
*G03G 21/20* (2006.01)

(52) U.S. Cl.
CPC ....... *G03G 15/2053* (2013.01); *G03G 21/206* (2013.01); *G03G 15/2017* (2013.01); *G03G 15/2064* (2013.01)

(58) Field of Classification Search
CPC ............ G03G 15/2053; G03G 21/206; G03G 2215/2003
See application file for complete search history.

(56) References Cited

U.S. PATENT DOCUMENTS

| | | | | |
|---|---|---|---|---|
| 2013/0071136 | A1 | 3/2013 | Gon | 399/94 |
| 2014/0119786 | A1 | 5/2014 | Ohata et al. | 399/328 |
| 2016/0011547 | A1* | 1/2016 | Nemoto | G03G 15/2017 399/92 |
| 2016/0238976 | A1 | 8/2016 | Gon | G03G 15/20 |
| 2017/0242380 | A1* | 8/2017 | Hayashi | G03G 21/206 |

FOREIGN PATENT DOCUMENTS

JP 2006-285126 A 10/2006

OTHER PUBLICATIONS

Extended European Search Report dated Aug. 21, 2025, issued by the European Patent Office in corresponding application EP 25164824.2.

* cited by examiner

*Primary Examiner* — Carla J Therrien
(74) *Attorney, Agent, or Firm* — Stein IP, LLC

(57) ABSTRACT

A fixing device includes an endless fixing belt, a fixing roller, a pressing member, and a heating unit. The heating unit includes a coil, a bobbin, an arch core, an arch core holder, and a cover. The cover covers the arch core holder from outward in the radial direction and forms an axially extending gas flow passage between the cover and the arch core holder. The cover has a pair of first opening portions disposed in opposite end parts of it along the axial direction and a second opening portion disposed in a middle part of it along the axial direction. An airflow entering the flow passage through one of the first and second opening portions circulates along the axial direction and is discharged through the other.

8 Claims, 12 Drawing Sheets

FIXING DEVICE AND IMAGE FORMING APPARATUS PROVIDED THEREWITH

INCORPORATION BY REFERENCE

This application is based on and claims the benefit of priority from Japanese Patent Application No. 2024-046560 filed on Mar. 22, 2024, the contents of which are hereby incorporated by reference.

BACKGROUND

The present disclosure relates to a fixing device for fixing a toner image transferred to a recording medium, and also relates to an image forming apparatus provided with such a fixing device.

A known fixing device includes an endless fixing belt, a fixing roller, a pressing member, and a heating unit. The fixing belt is rotatable along the conveyance direction of a recording medium. The fixing roller is disposed inward of the fixing belt in the radial direction and rotates about a rotation axis. The pressing member forms a fixing nip portion between itself and the fixing belt by being pressed against the fixing roller across the fixing belt under a predetermined pressure. The heating unit heats the fixing belt.

The heating unit has a coil, a bobbin, an arch core, an arch core holder, and a cover. The coil is disposed at the side opposite from the fixing roller in the radial direction across the fixing belt and extends along the axial direction. The bobbin is disposed between the coil and the fixing belt and holds the coil. The arch core covers the coil from outward in the radial direction and extends in the circumferential direction, and a plurality of arch cores are arranged in a row along the axial direction. The arch core holder holds the arch cores from outward in the radial direction. The cover covers the arch core holder from outward in the radial direction and forms an axially extending gas flow passage between the cover and the arch core holder. Circulating a gas through the flow passage in the axial direction permits the cooling of the coil.

The known fixing device suffers from uneven cooling of the coil between an upstream and a downstream part of the gas circulating in the axial direction. Also, improving its cooling performance requires it to be larger and to have a complex configuration.

In view of the above problems, an object of the disclosure is to provide a fixing device with a simple configuration that allows downsizing while efficiently and evenly cooling a coil, and to provide an image forming apparatus provided with such a fixing device.

SUMMARY

To achieve the above object, according to one configuration of the present disclosure, a fixing device includes an endless fixing belt, a pressing member, and a heating unit. The fixing belt is rotatable along the conveyance direction of a recording medium. The pressing member forms a fixing nip portion between itself and the fixing belt by being pressed against a fixing roller across the fixing belt under a predetermined pressure. The heating unit heats the fixing belt. The heating unit includes a coil, a bobbin, an arch core, an arch core holder, and a cover. The coil extends along the axial direction with respect to the axis of rotation of the fixing belt. The bobbin is disposed between the coil and the fixing belt and holds the coil. The arch core covers the coil from outward in a radial direction and extends in a circumferential direction, and a plurality of arch cores are arranged in a row along the axial direction. The arch core holder holds the arch cores from outward in the radial direction. The cover covers the arch core holder from outward in the radial direction and forms an axially extending gas flow passage between the cover and the arch core holder. The cover has a pair of first opening portions disposed in opposite end parts of it along the axial direction and a second opening portion disposed in a middle part of it along the axial direction. An airflow entering the flow passage through one of the first and the second opening portions circulates along the axial direction and is discharged through the other.

This and other objects of the present disclosure, and the specific benefits obtained according to the present disclosure, will become apparent from the description of embodiments which follows.

DETAILED DESCRIPTION

First Embodiment

Figure 1:
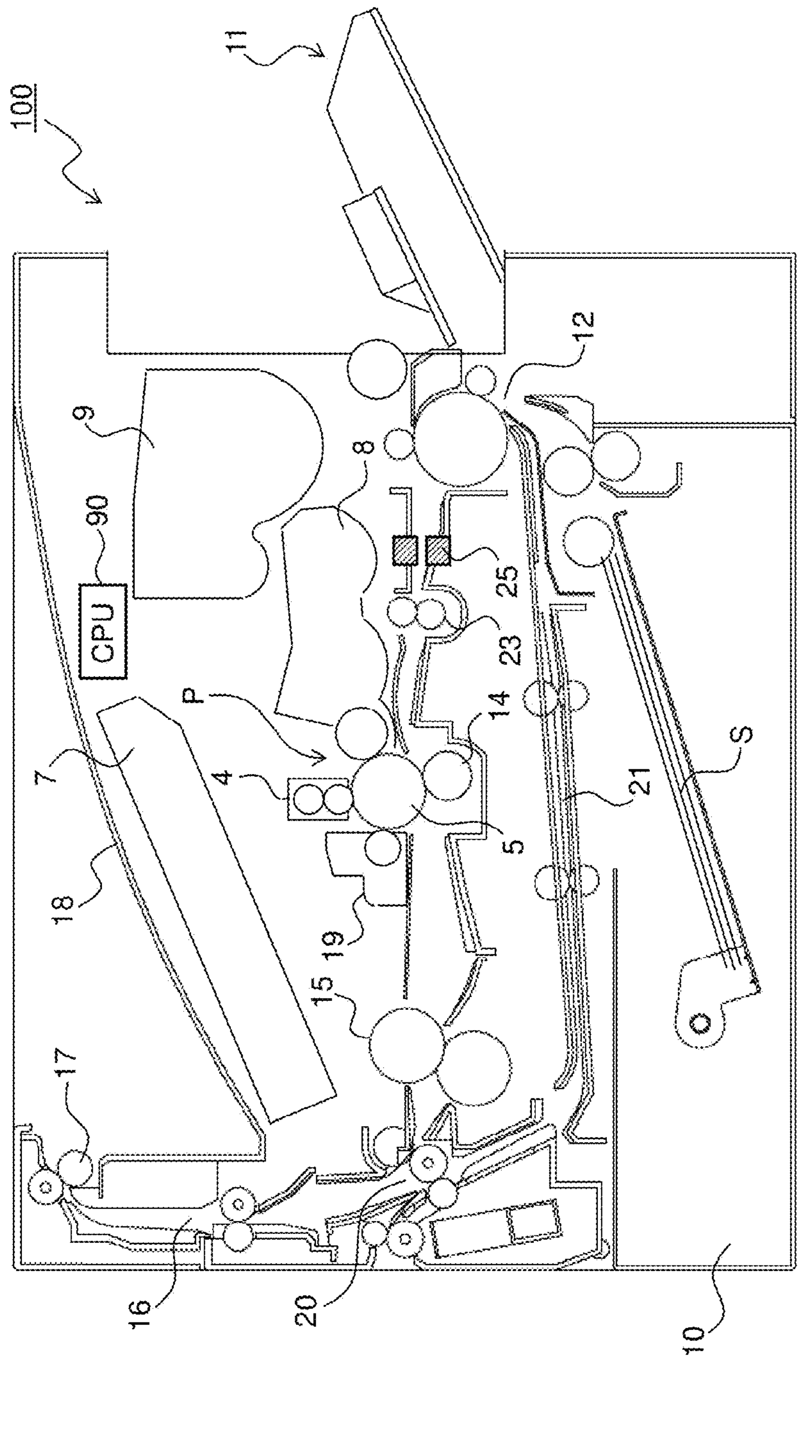
FIG. 1 is a side sectional view showing the internal structure of an image forming apparatus 100 that includes a fixing device 15 according to a first embodiment of the present disclosure.

A first embodiment of the present disclosure will be described below with reference to the accompanying drawings. FIG. 1 is a side sectional view showing the internal structure of an image forming apparatus 100 that includes a fixing device 15 according to the present disclosure. The image forming apparatus 100 includes an image forming portion P, a fixing device 15, and a control portion 90. The control portion 90 comprehensively controls the image forming portion P and the fixing device 15.

The image forming portion P is disposed in the image forming apparatus (in this embodiment, a monochrome printer) 100, and forms a monochrome image through the processes of electrostatic charging, exposure to light, image development, and image transfer. The image forming portion P includes a charging unit 4, an exposure unit (such as a laser scanning unit) 7, a developing unit 8, a transfer roller 14, a cleaning device 19, and a static eliminating device (not shown) along the rotating direction of a photosensitive drum 5 (clockwise in FIG. 1).

When image forming operation is performed, the photosensitive drum 5 rotating clockwise is electrostatically charged uniformly by the charging unit 4. Next, a laser beam based on document image data from the exposure unit 7 forms an electrostatic latent image on the photosensitive drum 5. Then, developer (hereinafter referred to as "toner") is attached to the electrostatic latent image by the developing unit 8 to form a toner image.

The toner is supplied to the developing unit 8 from a toner container 9. The image data is transmitted from a personal computer (not shown) or the like. The static eliminating device (not shown) that removes residual electric charge on the surface of the photosensitive drum 5 is provided downstream of the cleaning device 19 with respect to the rotation direction of the photosensitive drum 5.

Toward the photosensitive drum 5 on which the toner image has been formed as described above, a sheet S is conveyed from a sheet cassette 10 (or a manual sheet feed device 11) via a pair of registration rollers 23 with predetermined timing, and the toner image formed on the surface of photosensitive drum 5 is transferred to the sheet S by the transfer roller 14. The sheet S having the toner image transferred to it is separated from the photosensitive drum 5 and is conveyed to the fixing device 15 to fix the toner image. The sheet S having passed through the fixing device 15 is conveyed to an upper part of the apparatus by a sheet conveyance passage 16, and when an image is formed on only one side of the sheet S (simplex printing), the sheet S is discharged to a discharge tray 18 by a pair of discharge rollers 17.

On the other hand, when images are formed on both sides of sheet S (duplex printing), the conveyance direction is reversed after the trailing end of sheet S passes through a branch portion 20 of the sheet conveyance passage 16. Thus, the sheet S is sorted into a reversing conveyance passage 21 that branches from the branch portion 20 and is transported once again to the image forming portion P with the image side reversed. The subsequent toner image formed on the photosensitive drum 5 is then transferred by the transfer roller 14 to the unprinted side of the sheet S. The sheet S to which the toner image has been transferred is conveyed to the fixing device 15, where the toner image is fixed, and is then discharged to the discharge tray 18 by the pair of discharge rollers 17.

An edge detection sensor 25 is disposed upstream of the pair of registration rollers 23 in the sheet conveyance direction. The edge detection sensor 25 detects the position (edge position) of an edge of the sheet S in its width direction (the direction perpendicular to the sheet conveyance direction). As the edge detection sensor 25, a PI (photo interrupter) sensor that includes a detection section having a light emitting element comprising an LED or the like and a light receiving element comprising a photodiode or the like, for example, is used, and is disposed to face each edge part of the sheet S in the width direction.

Figure 2:
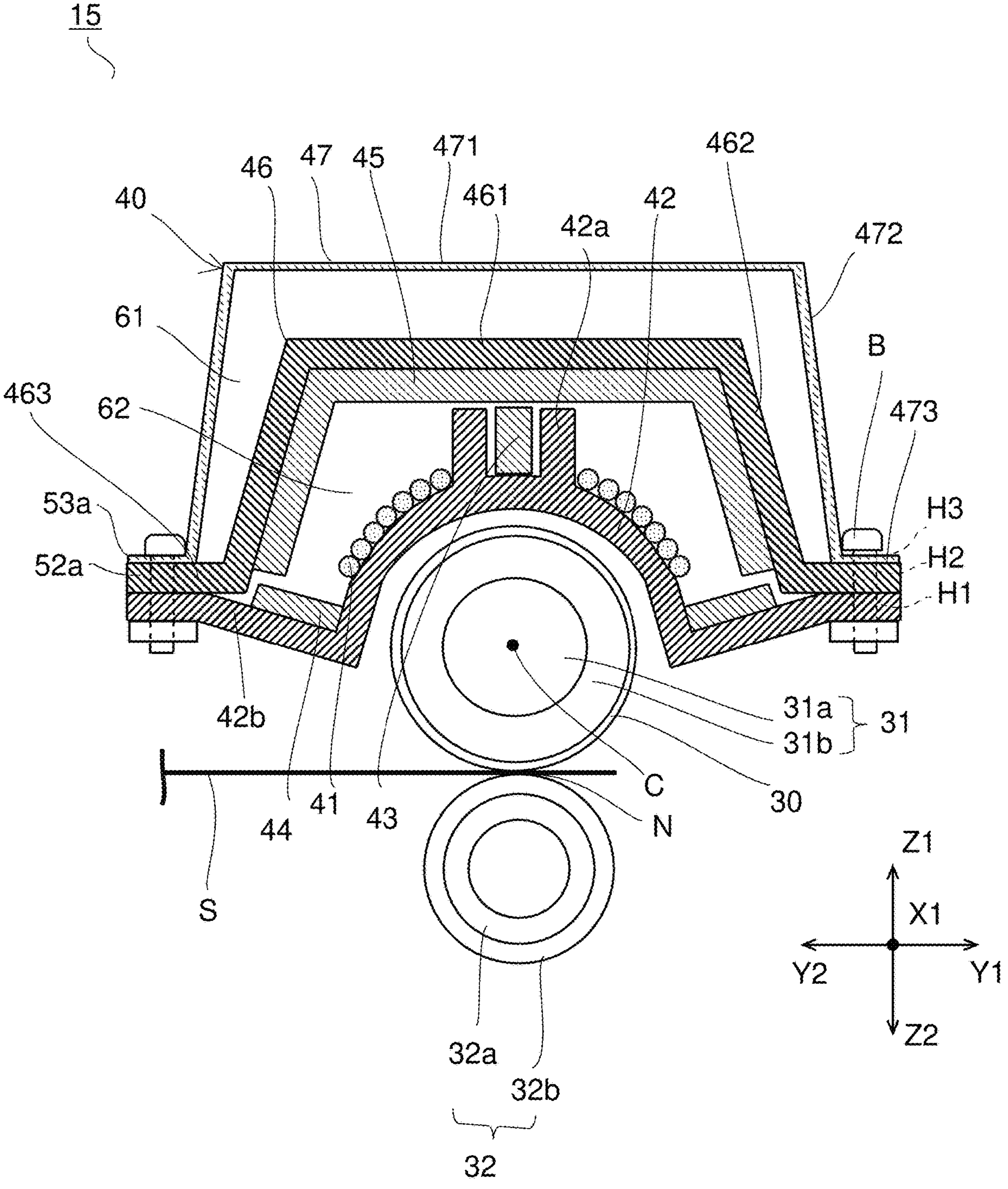
FIG. 2 is a sectional view of the fixing device 15 according to the first embodiment of the present disclosure.

FIG. 2 is a sectional view of the fixing device 15 mounted in the image forming apparatus 100, cut along a direction perpendicular to the rotation axis of a fixing roller 31. The housing of the fixing device 15 is omitted from illustration in FIG. 2. In the present specification, the direction in which the rotation axis C of the fixing roller 31 extends is referred to as the "axial direction (X1-X2)" and the direction orthogonal to the rotation axis C is referred to as the "radial direction. The direction about the rotation axis C is referred to as the "circumferential direction. In FIG. 2, a fixing belt 30 is disposed above Z1 a pressing roller 32, and the positional relationship between the fixing belt 30 and the pressure roller 32 is referred to as the "vertical direction (Z1-Z2). The direction orthogonal to the longitudinal direction (X1-X2) of a coil 41 is referred to as the "lateral direction (Y1-Y2). The lateral direction (Y1-Y2) is orthogonal to the axial direction (X1-X2) and to the vertical direction (Z1-Z2). These directions are not meant to limit the directions observed when the fixing device 15 is built in the image forming apparatus 100.

The fixing device 15 employs a belt fixing system and has the fixing belt 30, the fixing roller 31, the pressure roller (pressing member) 32, and a heating unit 40.

The fixing belt 30 is an endless belt and can rotate along the conveyance direction of the sheet (recording medium) S. The fixing belt 30 is fitted around the fixing roller 31 and has a width larger than that of the sheet feed area where the sheet (recording medium) S passes.

The fixing belt 30 releases heat to fix an image to the sheet S. The inner diameter of the fixing belt 30 is, for example, 40 mm. The fixing belt 30 is composed of, for example, a silicone rubber layer formed on a electroformed nickel base with a release layer formed on top of the silicone rubber layer. The thickness of the electroformed nickel base is, for example, 30 μm or more but 50 μm or less. The thickness of the silicone rubber layer is, for example, 200 μm or more but 500 μm or less.

The release layer is formed of, for example, a fluoropolymer such as perfluoro alkoxy fluoropolymer (PFA). The temperature of the fixing belt 30 is measured and adjusted with a temperature measuring device such as a thermistor.

The fixing roller 31 is cylindrical. The fixing roller 31 is disposed inward of the fixing belt 30 in the radial direction and rotates about the rotation axis C. The fixing roller 31 has a fixing metal base 31*a*, a fixing elastic layer 31*b*, and a fixing release layer (not shown) that extend along the rotation axis C. The fixing metal base 31*a* is formed of, for example, stainless steel or aluminum. The fixing metal core 31*a* is rotatably supported on a housing (not shown).

The fixing elastic layer 31*b* is provided on the outer circumferential surface of the fixing metal base 31*a*. The fixing elastic layer 31*b* is formed of, for example, silicone rubber foam. The thickness of the fixing elastic layer 31*b* is, for example, about 10 mm. By giving the fixing elastic layer 31*b* a thickness of about 10 mm, it is possible to secure an adequate amount of deformation under pressure from the pressure roller 32. This helps secure a sufficient width of the nip N in the axial direction to improve the fixing performance. Also, the change of the curvature of the fixing elastic layer 31*b* helps improve the separation performance of the sheet S leaving the fixing nip N.

Even if the fixing metal base 31*a* is configured with a non-magnetic material to reduce heat release, it may cause heat release under certain conditions. However, by giving the fixing elastic layer 31*b* a thickness of about 10 mm, it is possible to secure a sufficient distance between the fixing metal base 31*a* and the fixing belt 30. This prevents the fixing metal base 31*a* from releasing heat due to the magnetic flux leaking from the fixing elastic layer 31*b*. It is thus possible to prevent the fixing elastic layer 31*b* from overheating above its heat-resistant temperature.

The outer diameter of the fixing roller 31 is preferably set to be slightly smaller than the inner diameter of the fixing belt. This makes it easier to insert the fixing roller 31 into the fixing belt 30. When the fixing belt 30 and the fixing roller 31 are heated, the thermal expansion coefficient of the fixing elastic layer 31*b* is higher than that of the fixing belt 30. Thus, the fixing belt 30 stays in a state where it is pulled from inward by the fixing roller 31, and this stabilizes the belt track.

The fixing release layer (not shown) is provided on the outer circumferential surface of the fixing elastic layer 31*b*. The fixing release layer is formed, for example, with a tube of PFA (perfluoro alkoxy fluoropolymer) with a thickness of 20 to 30 μm. The configuration specifically described above is not meant to limit the configuration of the fixing roller 31 of the present disclosure.

The pressing roller 32 is kept in pressed contact with the fixing roller 31 under a predetermined pressure with the fixing belt 30 in between to form a fixing nip N against the fixing belt 30. Specifically, the pressing roller 32 is disposed below the fixing roller 31 and is supported on a housing (not shown). The pressing roller 32 is pressed against the fixing roller 31 under a predetermined pressure via, for example, an urging member (not shown). Thus, the pressing roller 32 stays in pressed contact with the fixing roller 31 across the fixing belt 30 to form the fixing nip portion N.

The pressing roller 32 is connected to a drive source (not shown) to be driven to rotate. As the pressing roller 32 is rotated in a counterclockwise direction in FIG. 2 by the drive source, the fixing belt 30 and the fixing roller 31 follow it to rotate in a clockwise direction opposite to the direction of rotation of the pressing roller 32. Thus, the sheet S conveyed passes through the fixing nip portion N.

The pressing roller 32 has a pressing metal base 32*a*, a pressing elastic layer 32*b*, and a pressing release layer (not shown). The pressing metal base 32*a* protrudes axially outward beyond the pressing elastic layer 32*b* (see FIG. 3). The pressing metal base 32*a* is formed of, for example, iron or stainless steel and constitutes the rotation shaft of the pressing roller 32. The pressing metal base 32*a* is rotatably supported on a housing (not shown).

An urging member (not shown) is attached to each end part of the pressing metal base 32*a* in the axial direction, and one end of the urging member is fixed to the housing (not shown). A spring, for example, is used as the urging member.

The pressing elastic layer 32*b* is provided on the outer circumference surface of the pressing metal base 32*a*. The pressing elasticity layer 32*b* is formed of, for example, silicone rubber. The pressing release layer is provided on the outer circumference surface of the pressing elastic layer 32*b*. The pressing release layer is formed of, for example, a tube of PFA (perfluoro alkoxy alkane). The configuration specifically described above is not meant to limit the configuration of the pressure roller 32 of the present disclosure.

Figure 3:
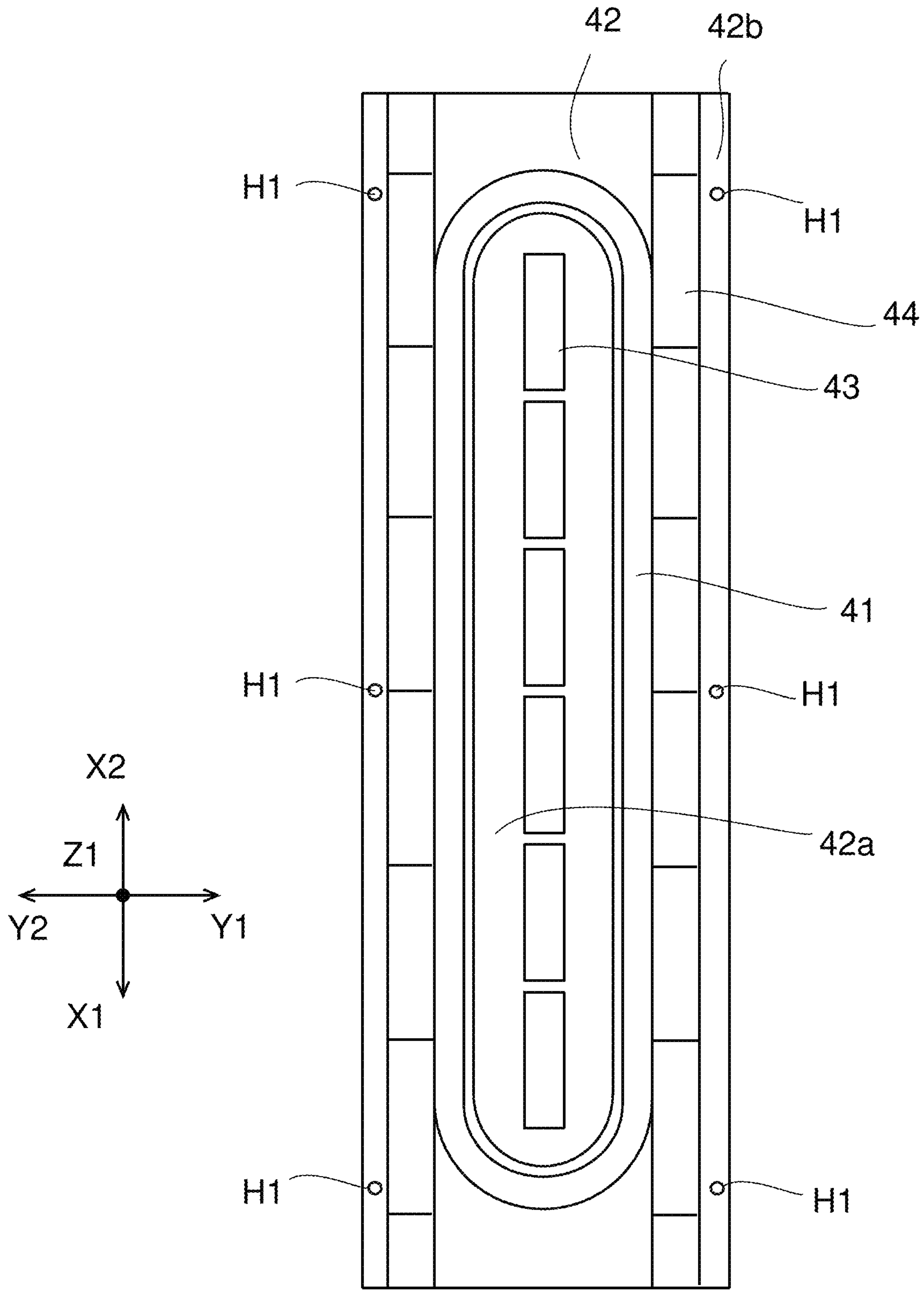
FIG. 3 is a top view showing part of a heating unit 40 in the fixing device 15 according to the first embodiment of the present disclosure.
Figure 4:
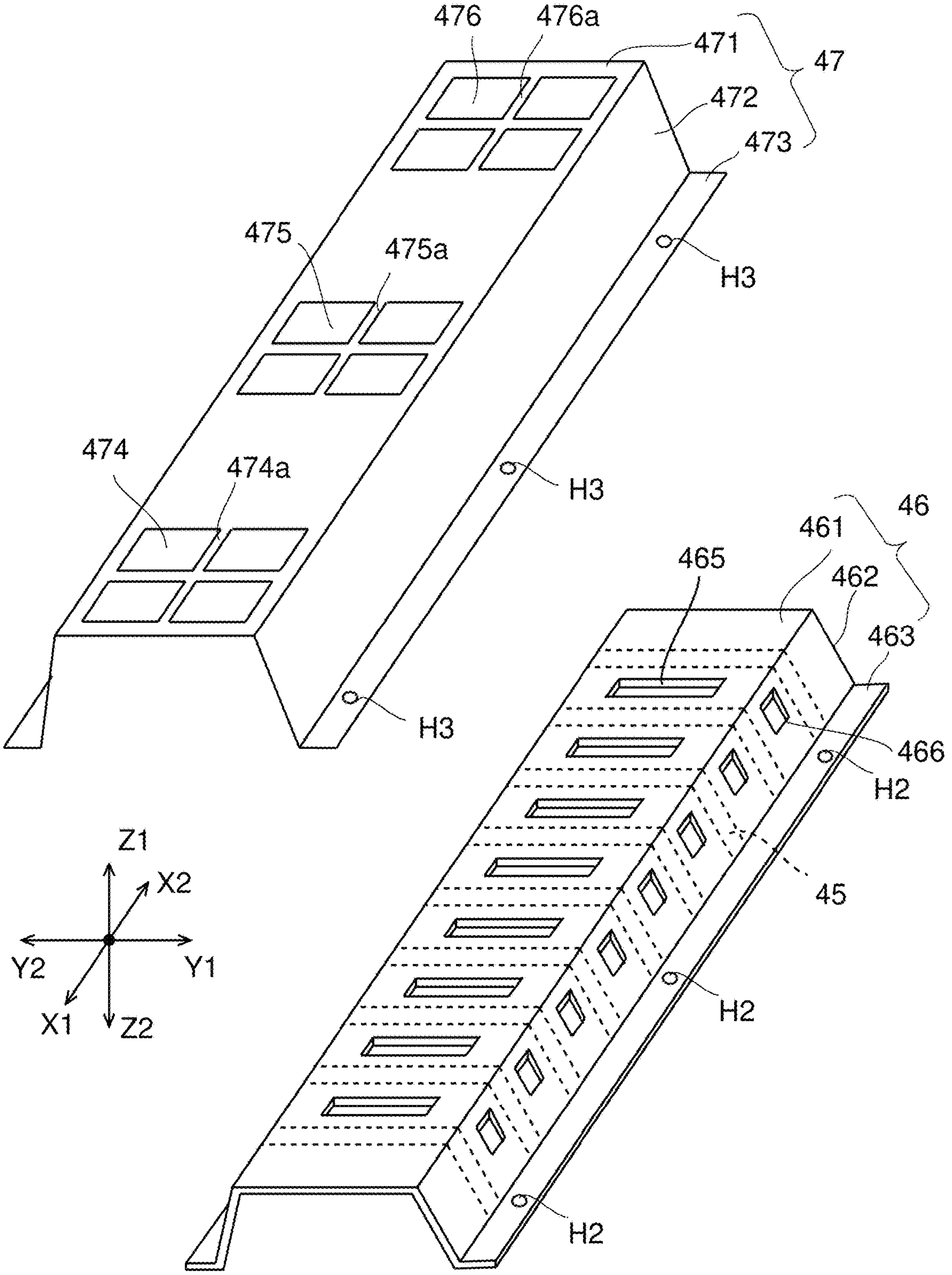
FIG. 4 is an exploded perspective view of an arch core 45 15, an arch core holder 46, and a cover 47 of the fixing device according to the first embodiment of the present disclosure.

FIG. 3 is a top view showing part of the heating unit 40, omitting an arch core 45, an arch core holder 46, and a cover 47. FIG. 4 is an exploded perspective view showing the arch core 45, the arch core holder 46, and the cover 47. The heating unit 40 heats the fixing belt 30. The heating unit 40 has a coil 41, a bobbin 42, a center core 43, a side core 44, the arch core 45, the arch core holder 46, and the cover 47 (see FIG. 2).

In this embodiment, the coil 41 is disposed at the opposite side of the fixing roller 31 in the radial direction across the fixing belt 30 and is formed with a conductor (e.g., Litz wire) wound multiple times (see FIG. 2). Thus, the coil 41 extends along the axial direction (X1-X2) with respect to the rotation axis of the fixing roller 31 and the fixing belt 30. Thus, the longitudinal direction of the coil 41 coincides with the axial direction (X1-X2).

The coil 41 is disposed at a predetermined interval from the fixing belt 30. The coil 41 is connected to a power supply circuit and generates an alternating-current magnetic flux from a high-frequency alternating current supplied from the power circuit. This alternating-current magnetic flux generates eddy currents in the fixing belt 10. The eddy currents produce Joule heat and the fixing belt 30 releases heat.

Since the coil 41 generates heat, gas (e.g., air) is introduced into the heating unit 40 to cool the coil 41. The gas that has cooled the coil 41 is discharged out of the heating unit 40. The cooling of the coil 41 will be described in detail later. In the following description, the terms "upstream" and "downstream" denote upstream and downstream with respect to the flow of the gas (airflow) that cools the coil 41.

The bobbin 42 is disposed between the coil 41 and the fixing belt 30 and holds the coil 41 (see FIG. 2). In this embodiment, the bobbin 42 covers an upper half of the fixing belt 30 and is in a semi-cylindrical shape. The bobbin 42 holds the coil 41 on its top surface.

The bobbin 42 has a center core holder 42*a* and a side core holder 42*b*. In this embodiment, the bobbin 42, the center core holder 42*a*, and the side core holder 42*b* are integrally molded from heat-resistant resin. The center core holder 42*a* protrudes radially outward from a top part of the bobbin 42 to have an annular shape as seen in a top view (see FIG. 3). In this embodiment, the longitudinal direction of the center core holder 42*a* coincides with the axial direction (X1-X2). A plurality of center cores 43 are disposed inside the center core holder 42*a*.

The side core holder 42*b* extends radially outward from the lower end of the bobbin 42 at each side. A plurality of the side cores 44 are held on the top surface of the side core holder 42*b*. A plurality of screw holes H1 are formed at the radially outer ends of the side core holder 42*b*. In this embodiment, the screw holes H1 are disposed in a row of three of them in the axial direction (X1-X2) at each side.

The arch core 45, the center core 43 and the side cores 44 are formed of, for example, a magnetic material such as ferrite. The coil 41 is surrounded by the arch core 45, the center core 43 and the side cores 44. Thus, the magnetic flux generated from the coil 41 is directed by the arch core 45, the center core 43 and the side cores 44 so as to pass in the axial direction (X1-X2) along the fixing belt 30. In this way, it is possible to effectively generate eddy currents in the fixing belt 30.

More specifically, the center core 43 is held in the center core holder 42*a* and is disposed inside the coil 41. A plurality of center cores 43 are disposed in straight lines along the axial direction (X1-X2). In this embodiment, the center cores 43 are in the shape of a rectangular parallelepiped and six of them are disposed (see FIG. 3). The configuration specifically described above where six center cores 43 are disposed is not meant as any limitation: the number and arrangement (layout) of center cores 43 are not limited to what is specifically shown in FIG. 3.

A pair of side cores 44 are held in the side core holder 42*b* and are disposed outside the coil 41, adjacent to it in the radial direction. A plurality of side cores 44 are disposed in straight lines along the longitudinal direction (X1-X2) of the coil 41. In this embodiment, the center cores 43 are in the shape of a rectangular parallelepiped and six of them are disposed on each side core holder 42*b* (see FIG. 3).

The arch core 45 is formed in an arch shape; it covers the coil 41 from outward in the radial direction, and a plurality of them are disposed in a row along the axial direction (X1-X2) (see FIG. 4). In this embodiment, nine arch cores 45 are disposed.

The arch core holder 46 is formed of, for example, an insulating synthetic resin and holds the arch core 45 from outward in the radial direction. The arch core holder 46 and the arch cores 45 can be bonded together via Si adhesive, for example. The arch core holder 46 is formed substantially in a U-shape on a section orthogonal to the axial direction and extends along the longitudinal direction (X1-X2) of the coil 41. More specifically, the arch core holder 46 has a holder top wall portion 461, a holder side wall portion 462, and a holder flange portion 463.

The holder top wall portion 461 is rectangular in a plan view, and its longer sides extend along the axial direction (X1-X2). The holder side wall portions 462 are connected to the longer sides of the holder top wall portions 461, and cover the coil 41 from the lateral direction (Y1-Y2). The holder flange portions 463 are connected to the lower ends of the holder side wall portions 462 and extend radially outward. The holder flange portion 463 has a plurality of screw holes H2 formed in it and, in this embodiment, three of the screw holes H2 are disposed in a row along the axial direction at each side.

Through holes 465 are formed in the holder top wall 461, and through holes 466 are formed in the holder side wall 462. The through holes 465 and 466 are rectangular in a plain view and are disposed in rows along the lateral direction (Y1-Y2). In this embodiment, the through hole 465 has a larger opening area than the through hole 466 and is disposed at the middle of the holder top wall 461 along the lateral direction (Y1-Y2). A plurality of rows of through holes 465 and 466 arrayed along the lateral direction (Y1-Y2) are disposed at predetermined intervals along the axial direction (X1-X2). In this embodiment, eight rows of through holes 465 and 466 are formed. One arch core 45 is disposed between adjacent rows, arrayed along the axial direction, of through holes 465 and 466.

The cover 47 covers the arch core holder 46 from outward in the radial direction and forms, together with the arch core holder 46, a gas flow passage 61 extending along the axial direction (X1-X2). The cover 47 is formed substantially in a U-shape on a section perpendicular to the axial direction and extends along the longitudinal direction (X1-X2) of the coil 41. For example, the cover 47 is made of metal such as aluminum. The cover 47 intercepts the magnetic flux generated from the coil 41 and suppresses the leakage of the magnetic flux to outside the heating unit 40. The cover 47 also increases the strength of the heating unit 40.

More specifically, the cover 47 has a cover top wall portion 471, a cover side wall portion 472, and a cover flange portion 473. The cover top wall portion 471 is rectangular in a plain view, and its longer sides extend along the axial direction (X1-X2). In this embodiment, the cover top wall portion 471 is disposed parallel to the holder top wall portion 461 and faces it in the vertical direction (Z1-Z2) across the flow passage 61.

The cover side wall portions 472 are connected to the longer sides of the cover top wall portions 471 and cover the holder side wall portions 462 from outward in the radial direction. In this embodiment, the cover side wall portion 472 faces the holder side wall portion 462 in the lateral direction (Y1-Y2) across the flow passage 61.

The cover flange portions 473 are connected to the lower ends of the cover side wall portions 472 and extend radially outward. The cover flange portion 473 has a plurality of screw holes H3 formed in it and, in this embodiment, three of the screw holes H3 are disposed in a row along the axial direction at each side. Screws B are inserted (see FIG. 2) through the screw holes H3, the screw holes H2 in the holder flange portion 463, and the screw holes H1 in the side core holder 42*b*. Thereby the cover 47, the arch core holder 46 and the bobbin 42 are screwed together to form a single unit. In this way, the heating unit 40 is configured as a unit and is fixed inside the image forming apparatus 100.

The cover top wall portion 471 has a first opening portion 474, a second opening portion 475 and a first opening portion 476 disposed in a row in the axial direction (X1-X2). Thus, the cover 47 has a pair of first opening portions 474 and 476 disposed in opposite end parts in the axial direction (X1-X2) and a second opening portion 475 disposed in a middle part in the axial direction (X1-X2). In this embodiment, the first opening portions 474 and 476 and the second opening portion 475 are formed in a rectangular shape as seen in a top view and have the same opening area; instead, the first opening portions 474 and 476 and the second opening portion 475 may be formed in different shapes.

The first opening portions 474 and 476 and the second opening portions 475 have supports portion 474*a*, 476*a*, and 475*a* formed in them. In this embodiment, the support portions 474*a*, 476*a*, and 475*a* are formed in a cross shape as seen in a top view and traverse the first opening portions 474 and 476 and the second opening portion 475. Providing the support portions 474*a*, 476*a*, and 475*a* helps improve the strength of the cover 47. This makes it possible to form the first opening portion 474 and 476 and the second opening portion 475 smaller, and to prevent the leakage of magnetic flux to outside the heating unit 40. While in this embodiment the support portions 474*a*, 476*a*, and 475*a* are formed in a cross shape as seen in a top view, the shape of the support portions 474*a*, 476*a*, and 475*a* is not limited. For example, they may be formed in a reticular shape. The support portions 474*a*, 476*a*, 475*a*, the first opening portions 474 and 476 and the second opening portion 475 can be easily formed by cutting out parts of the cover top wall portion 471 in the shape of rectangles.

Figure 5:
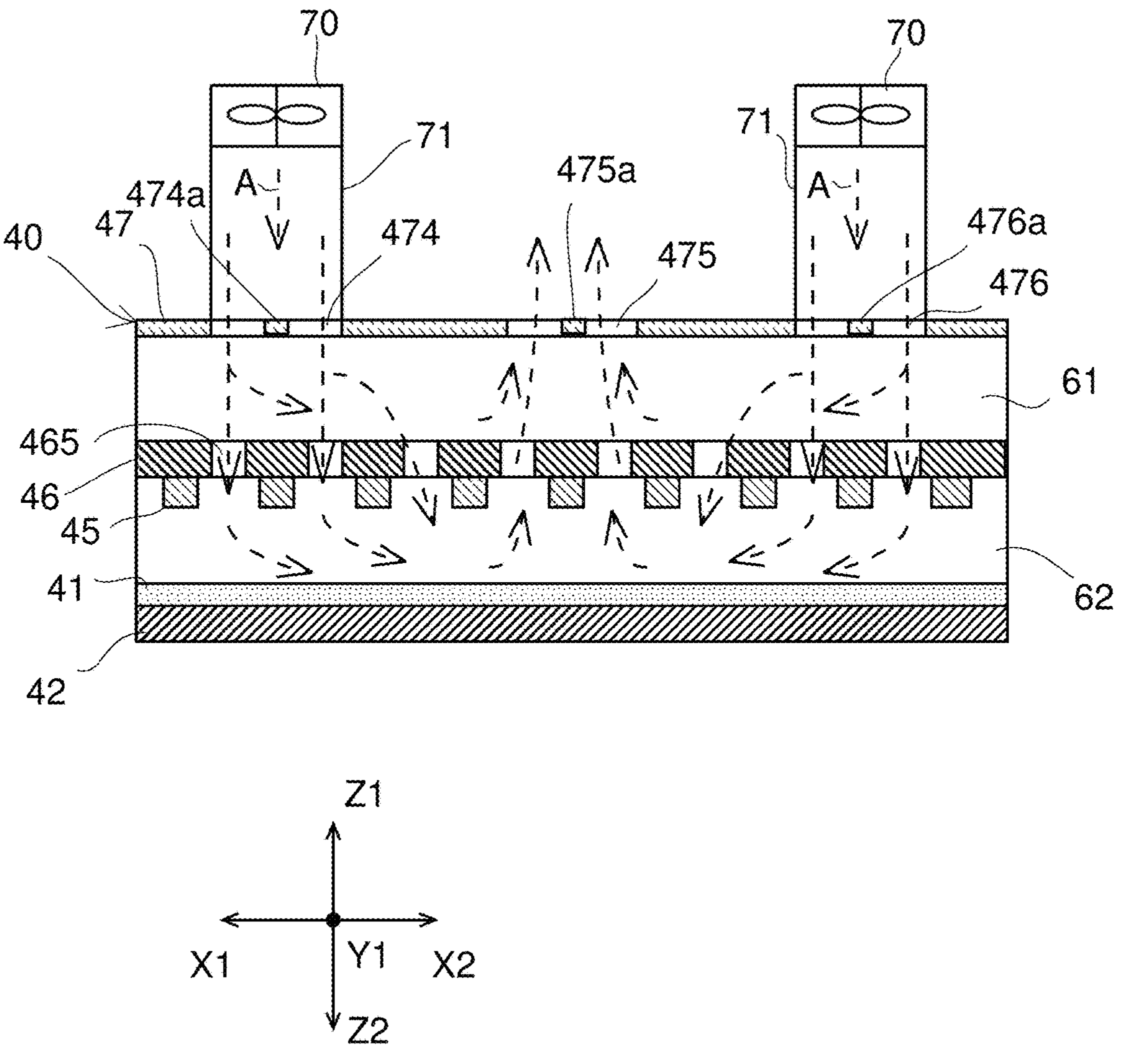
FIG. 5 is an illustrative diagram showing the flow of gas circulating in the heating unit 40 in the fixing device 15 according to the first embodiment of the present disclosure.

FIG. 5 is an illustrative diagram showing the flow of gas A circulating in the heating unit 40. In FIG. 5, the flow of gas A is indicated by dashed arrows. In this embodiment, the fixing unit 15 further has a blower 70 that sends gas to inside the cover 47, and the blower 70 communicates with the first opening portions 474 and 476 via a duct 71. The blower 70 includes, for example, a fan, which sucks in gas (e.g., air) from outside the image forming apparatus 100 and sends the gas A to the heating unit 40.

In this embodiment, the duct 71 covers the first opening portions 474, 476 and is connected at one end to the cover 47. The duct 71 sends gas A from the blower 70 to the first openings 474 and 476. Providing the duct 71 helps increase the blowing efficiency of the blower 70 to efficiently cool the coil 41. In this embodiment, the first openings 474 and 476 function as an intake port through which gas A flows to inside the cover 47.

Preferably, the other end of the duct 71 communicates with outside the image forming apparatus 100. The duct 71 can be omitted and instead the blower 70 can be disposed close to the first opening portion 474. This allows downsizing of the fixing unit 15.

Part of the gas A that has flowed to inside of the cover 47 through the first opening portions 474 and 476 passes through the flow passage 61 toward a middle part of it in the axial direction (X1-X2) 61. In the middle part of the flow passage 61 in the axial direction (X1-X2), the gas A passing in the axial direction X1 and the gas A passing in the axial direction X merge and are discharged to outside the cover 47 through the second opening portion 475. In this embodiment, the second opening portion 475 functions as an exhaust port for discharging the gas A to outside the cover 47.

Part of the gas A flows into the arch core holder 46 via the through holes 465 and 466. The gas A that has flowed into the arch core holder 46 passes through a flow passage 62 toward a middle part of it in the axial direction (X1-X2). In the middle part of the flow passage 61 in the axial direction (X1-X2), the gas A passing in the axial direction X1 and the gas A passing in the axial direction X2 merge and flow into the flow passage 61 via the through holes 465 and 466, and are discharged to outside the cover 47 via the second opening portion 475.

Thus, the airflow of the gas A that has flowed into the flow passage 61 through the pair of first opening portions 474 and 476 disposed in opposite end parts in the axial direction (X1-X2) circulates in the axial direction (X1-X2) and is discharged through the second opening portion 475 disposed in a middle part in the axial direction (X1-X2).

Meanwhile, the gas A that has flowed to inside the cover 47 from opposite ends part in the axial direction (X1-X2) circulates across the surface of the coil 41. This allows the coil 41 to be cooled from opposite end parts toward a middle part of it in the axial direction (X1-X2). In this way, by dividing the flow passage 61 into two parts in the axial directions (X1-X2) and sending the gas A into each of them, it is possible to suppress uneven cooling of the coil 41 in the axial direction (X1-X2) and thus to cool the coil 41 efficiently and evenly. Also, by merging the gas A that has flowed in through the first opening portions 474 and 476 at two locations and discharging it through the second opening portion 475 at one location, it is possible to downsize the fixing device 15 with a simple configuration.

The gas A discharged to outside the cover 47 has its temperature raised with the heat received from the coil 41. Thus, the second opening portion 475 can be connected to a duct (not shown) so that the gas A may be discharged out of the image forming apparatus 100 via the duct. Here, a blower (not shown) can be disposed in the duct to send the gas A out of the image forming apparatus 100. When the second opening portion 475 is open facing outside the image forming apparatus 100, the duct can be omitted. The position of the duct is designed so that the discharged gas A may not mix with the sucked-in gas A.

Second Embodiment

Figure 6:
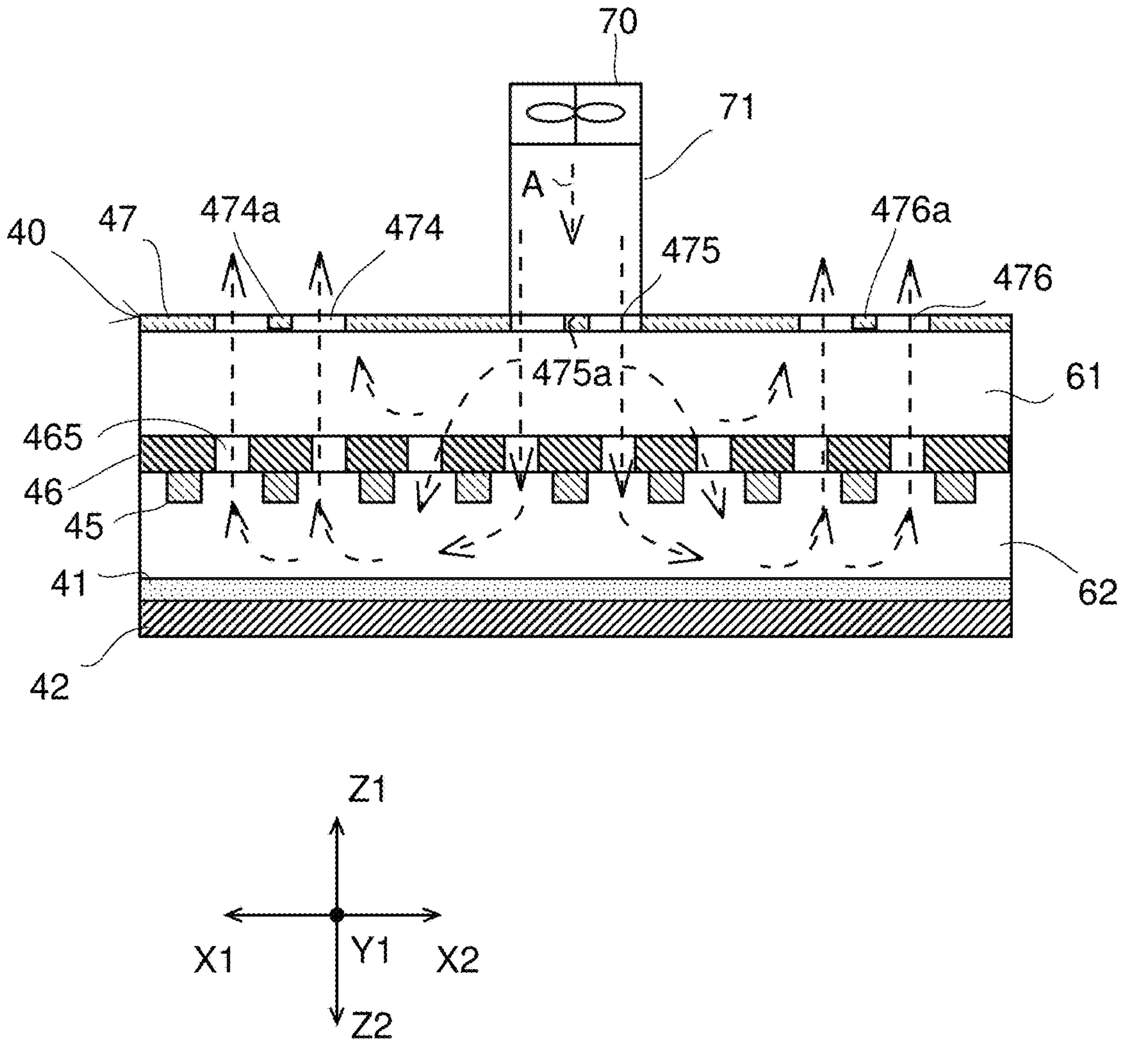
FIG. 6 is an illustrative diagram showing the flow of gas circulating in the heating unit 40 in the fixing device 15 according to a second embodiment of the present disclosure.

Next, a second embodiment of the present disclosure will be described. FIG. 6 is an illustrative diagram showing the flow of gas A circulating in the heating unit 40 of the second embodiment. In FIG. 6, the flow of gas A is indicated by dashed arrows. For convenience of description, parts similar to those in the first embodiment described previously and shown in FIGS. 1 to 5 are assigned the same reference signs. In the second embodiment, the blower 70 communicates with the second opening portion 475 through the duct 71.

The duct 71 sends gas A from the blower 70 to the second opening portion 475. In this embodiment, the second opening portion 475 functions as an intake port through which the gas A flows to inside the cover 47.

Part of the gas A that has flowed to inside the cover 47 via the second opening portion 475 branches into the axial directions X1 and X2, respectively passing toward opposite end portions in the axial direction, and is discharged to outside the cover 47 via the first opening portions 474 and 476. In this embodiment, the first opening portions 474 and 476 function as an exhaust port for discharging gas A to outside the cover 47.

Part of the gas A flows into the arch core holder 46 via a through hole 465 in a middle part of the arch core holder 46 in the axial direction (X1-X2). The gas A that has flowed into the arch core holder 46 branches into the axial directions X1 and X2 in the flow passage 62, respectively passing toward opposite end portions in the axial direction. In the opposite end parts of the flow passage 62 in the axial direction (X1-X2), the gas A passing in the axial direction X1 and the gas A passing in the axial direction X2 flow into the flow passage 61 via the through hole 465 and are discharged to outside the cover 47 via the first opening portions 474 and 476.

Thus, the air flow of the gas A that has flowed into the flow passage 61 through the second opening portion 475 disposed in a middle part in the axial direction (X1-X2) branches and circulates in the axial directions (X1-X2) and is discharged through the first opening portions 474 and 476 disposed in opposite end portions.

The gas A that has flowed to inside the cover 47 in a middle part of it in the axial direction (X1-X2) branches in the axial directions (X1-X2) and circulates across along the surface of the coil 41. This allows the coil 41 to be cooled from a middle part toward opposite end parts of it in the axial direction (X1-X2). In this way, by dividing the flow passage 61 into two parts in the axial direction (X1-X2) and feeding gas A into each of them, it is possible to suppress uneven cooling of the coil 41 in its axial direction (X1-X2) and thus to cool the coil 41 efficiently and evenly. Also, by branching the gas A that has flowed in through the second opening portions 475 at one location and discharging it through the first opening portions 474 and 476 at two locations, it is possible to downsize the fixing device 15 with a simple configuration.

Also in this embodiment, the same effect as with the first embodiment can be obtained by omitting the duct 71. A duct (not shown) can be connected to the first opening portions 474 and 476 so that, through the duct, gas A can be discharged out of the image forming apparatus 100.

Third Embodiment

Figure 7:
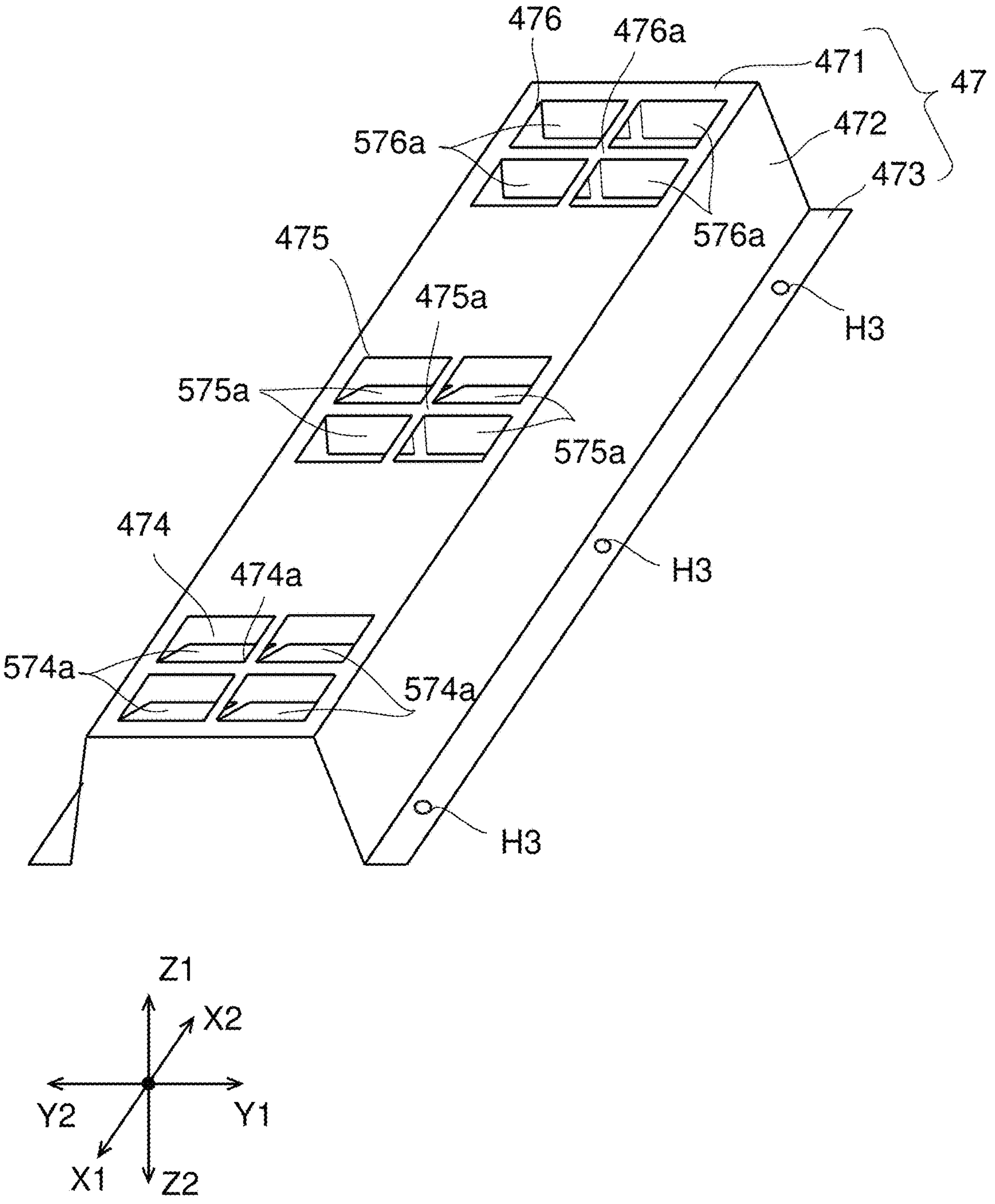
FIG. 7 is an exploded perspective view of the cover 47 of the fixing device 15 according to a third embodiment of the present disclosure.
Figure 8:
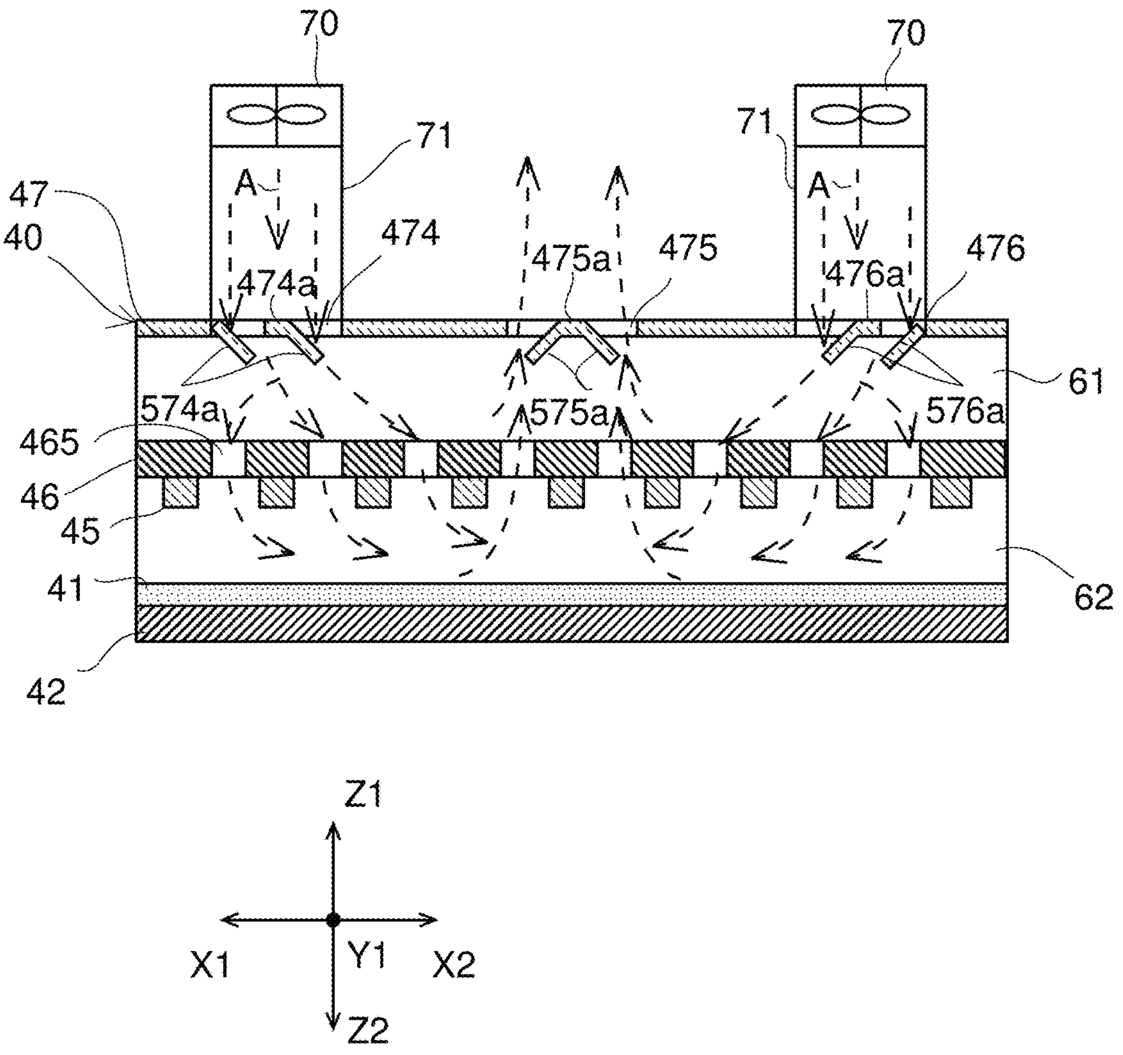
FIG. 8 is an illustrative diagram showing the flow of gas circulating in the heating unit 40 in the fixing device 15 of the third embodiment of the present disclosure.

Next, a third embodiment of the present disclosure will be described. FIG. 7 is an exploded perspective view of a cover 47 according to the third embodiment, and FIG. 8 is an illustrative diagram showing the flow of gas A circulating in the heating unit 40 of the third embodiment. In FIG. 8, the flow of gas A is indicated by dashed arrows. For convenience of description, parts similar to those in the first embodiment described previously and shown in FIGS. 1 to 5 are assigned the same reference signs. In the third embodiment, guide portions 574*a*, 575*a*, and 576*a* are provided to adjust the direction of the air flow.

In this embodiment, the first opening portions 474 and 476 function as intake ports through which gas A flows to inside the cover 47. On the other hand, the second opening portion 475 functions as an exhaust port through which gas A is discharged to outside the cover 47.

A plurality of each of the guide portions 574*a*, 575*a*, and 576*a* are formed in the form of plates and, in this embodiment, four of each are disposed. The guide portion 574*a* is connected to the support portion 474*a*. The guide portion 575*a* is connected to the support portion 475*a*. The guide portion 576*a* is connected to the support portion 476*a*.

A pair of guide portions 575*a* arrayed along the axial direction (X1-X2) are inclined so as to be increasingly far from each other toward the arch core holder 46 (Z2 direction). This allows the gas A to be smoothly discharged to outside the cover 47 via the second opening portion 475.

The guide portions 574*a* and 576*a* are inclined so as to be increasingly close to the second opening portion 475, where the air flow is discharged, toward the arch core holder 46 (Z2 direction). This allows the gas A that flows to inside the cover 47 through the first opening portion 474 and 476 to be smoothly guided toward the discharge port (second opening portion 475). This helps reduce the gas A that flows directly into the through hole 465, which is disposed directly below the first opening portions 474 and 476. Thus, it is possible to suppress excessive cooling of the part of the coil 41 disposed directly under the first opening portions 474 and 476.

When the second opening portion 475 functions as an intake port, the inclined portions 575*a* arrayed along the axial direction can smoothly branch the gas A that flows to inside the cover 47 via the second opening 475 into the axial direction (X1-X2). This helps reduce the gas A that flows directly into the through hole 465, which is disposed directly below the second opening portion 475. Thus, it is possible to suppress excessive cooling of the part of the coil 41 disposed directly under the second opening portion 475. In this way, it is possible to suppress uneven cooling of the coil 41 in the axial direction (X1-X2) and thus to cool the coil 41 more efficiently and evenly.

In this embodiment, four of each of the inclined portions 574*a*, 576*a*, and 575*a* are provided to correspond to the support portions 474*a*, 476*a*, and 475*a*, which are formed in a cross shape as seen in a top view but this is not meant to limit the present disclosure. The inclined portions 574*a*, 576*a*, and 575*a* can be in any shape other than rectangular.

The guide portions 574*a*, 575*a*, and 576*a* can be easily formed by cutting and bending parts of the cover top wall portion 471 along the first openings portions 474 and 476 and the second opening portion 475. In other words, the guide portions 574*a*, 575*a*, and 576*a* are formed by bending parts of the cover 47. This allows easy formation of the guide portions 574*a*, 575*a*, and 576*a* while reducing production costs.

In this embodiment, the guide portions 574*a*, 576*a*, and 575*a* are provided for both the first opening portions 474 and 476, which function as intake ports, and the second opening portion 475, which functions as an exhaust port. Instead, the guide portion 575*a* at the exhaust side can be omitted and only the guide portions 574*a* and 576*a* at the intake side can be provided. In a case where the first opening portions 474 and 476 function as exhaust ports and the second opening portion 475 functions as an intake port, the guide portions 574*a* and 576*a* at the exhaust side can be omitted and only the guide portion 575*a* at the intake side can be provided.

Fourth Embodiment

Figure 9:
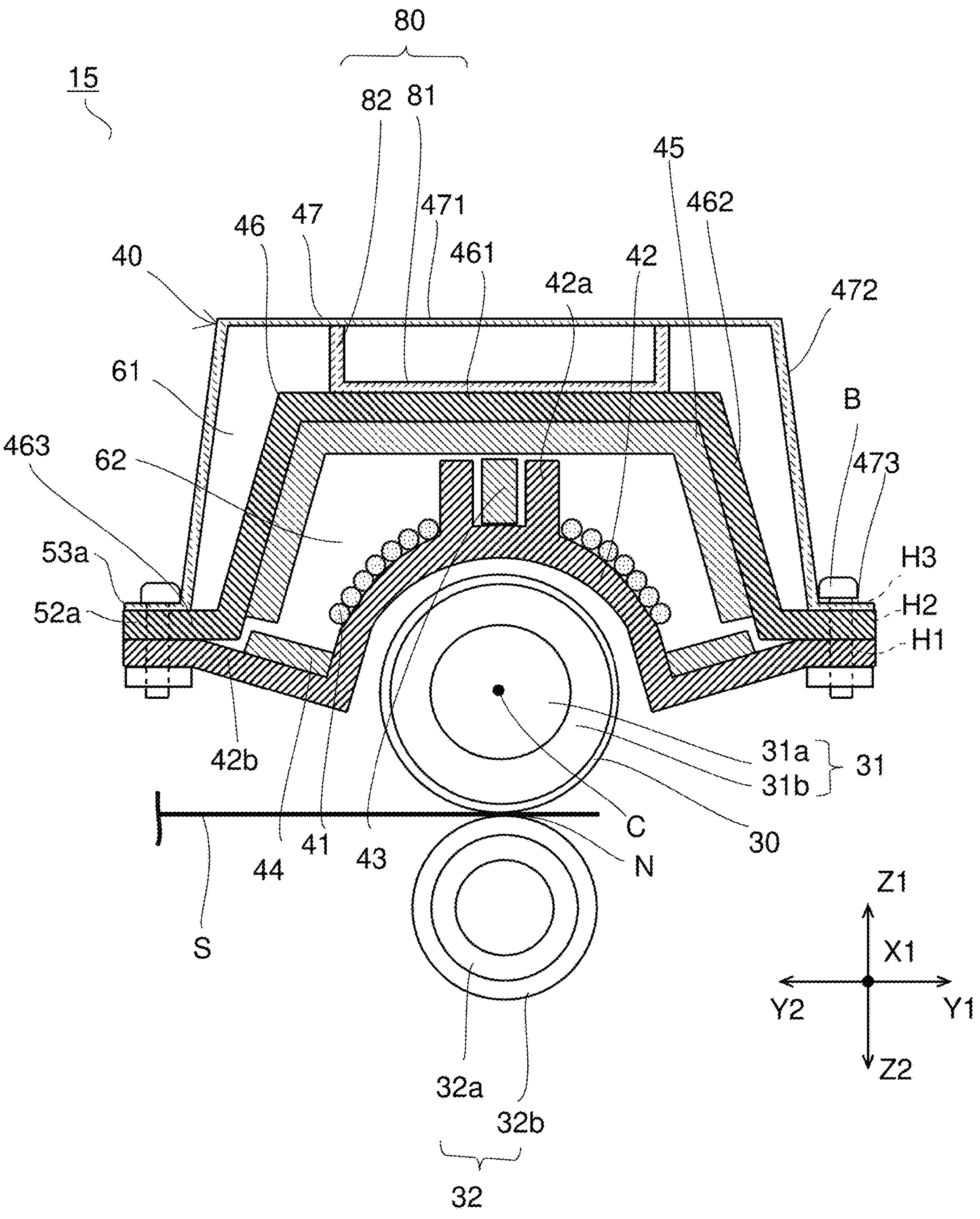
FIG. 9 is a sectional view of the fixing device 15 according to a fourth embodiment of the present disclosure.
Figure 10:
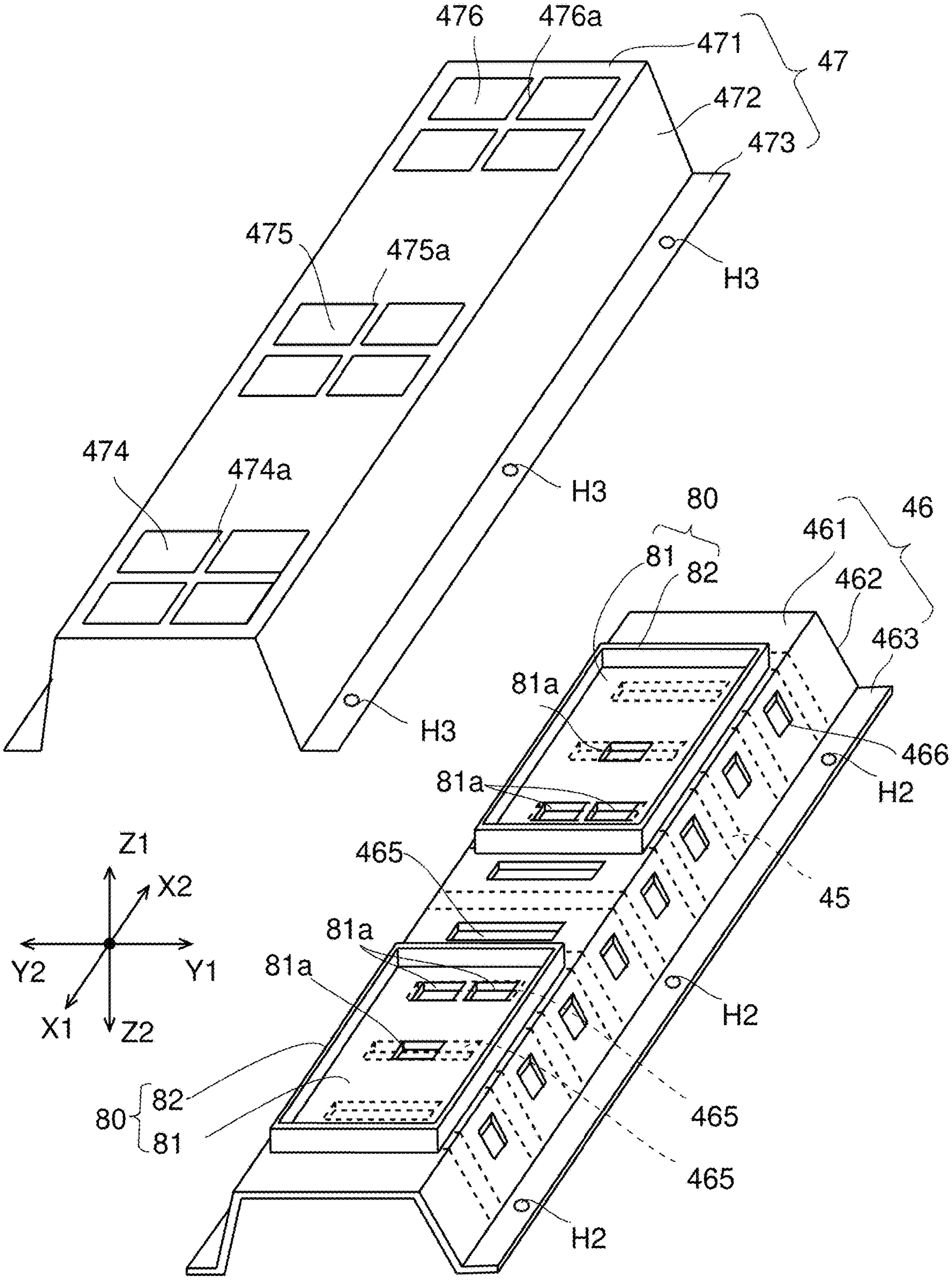
FIG. 10 is an exploded perspective view of the arch core 45, the arch core holder 46, an inner duct 80, and the cover 47 of the fixing device 15 according to the fourth embodiment of the present disclosure.
Figure 11:
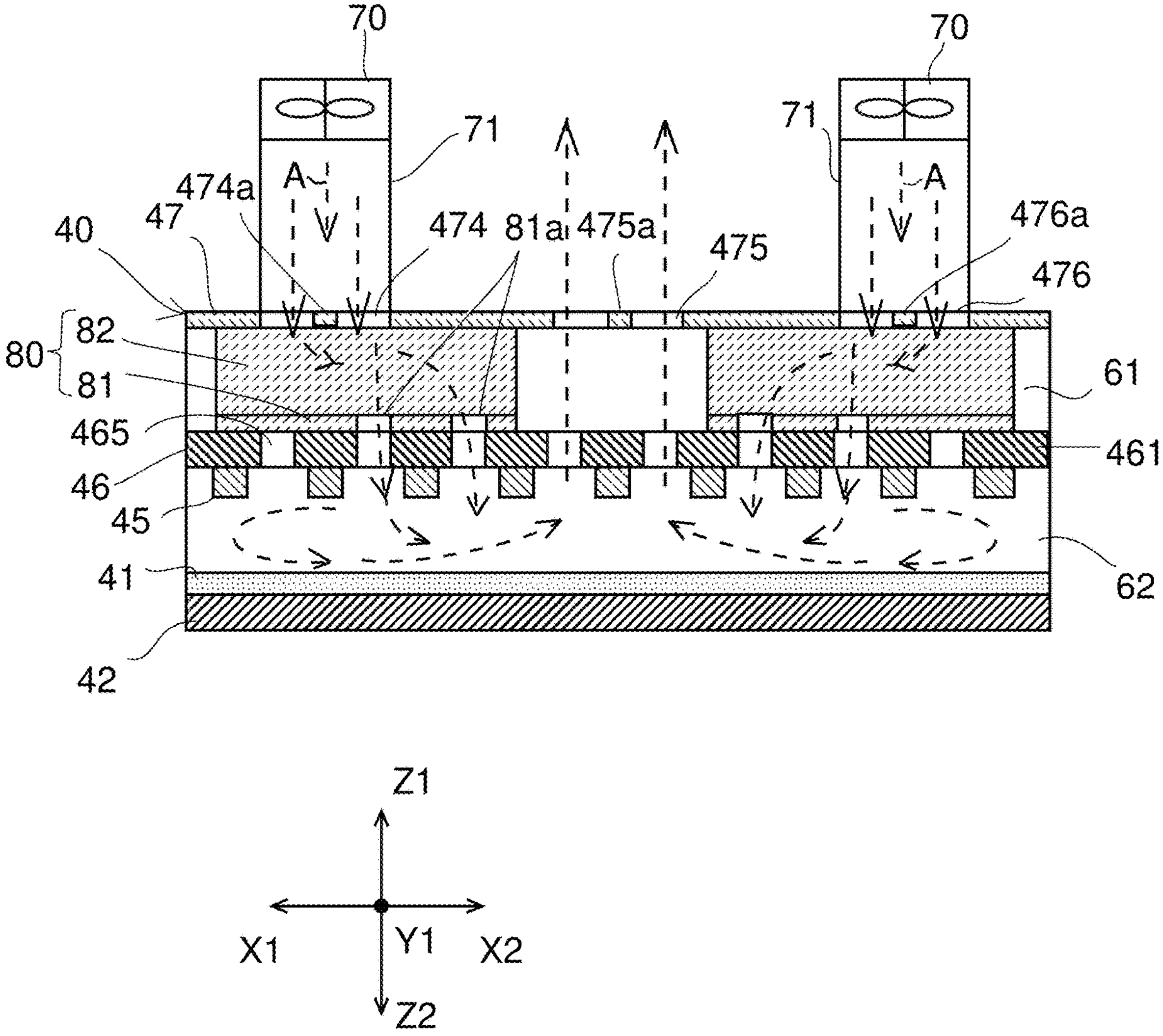
FIG. 11 is an illustrative diagram showing the flow of gas circulating in the heating unit 40 in the fixing device 15 according to the fourth embodiment of the present disclosure.

Next, a fourth embodiment of the present disclosure will be described. FIG. 9 is a sectional view of the fixing unit 15 of the fourth embodiment, and FIG. 10 is an exploded perspective view of the arch core 45, the arch core holder 46, the inner duct 80, and the cover 47. FIG. 11 is an illustrative diagram showing the flow of gas A circulating in the heating unit 40. For convenience of description, parts similar to those in the first embodiment described previously and shown in FIGS. 1 to 5 are assigned the same reference signs. In the fourth embodiment, two inner ducts 80 are disposed between the cover 47 and the arch core holder 46.

The inner duct 80 is integrally molded from a heat-resistant resin such as polyethylene terephthalate and is formed in a U-shape on a section perpendicular to the axial direction (X1-X2). The inner duct 80 extends in the axial direction (X1-X2). The inner duct 80 is disposed so as to face, in the vertical direction (Y1-Y2), the first opening portions 474 and 476, which function as an intake port.

The inner duct 80 has a duct bottom wall portion 81 and a duct side wall portion (partition wall) 82. The duct bottom wall portion 81 is disposed on the top surface of the holder top wall portion 461 and faces the cover top wall portion 471 in the vertical direction (Z1-Z2) across a gap. The duct side wall portion 82 protrudes upward Z1 from a circumferential part of the duct bottom wall portion 81 and surrounds the duct bottom wall portion 81. In this embodiment, part of the upper end of the duct sidewall portion 82 is in contact with the holder top wall 461 (see FIG. 9); it however does not matter whether or not the upper end of the duct sidewall portion 82 and the holder top wall 461 are in contact with each other. Thus, the plate-form duct side wall portion (dividing wall) 82 stands upright in a radial direction and extends in the axial direction on a section perpendicular to the axial direction. The duct side wall portion (dividing wall) 82 also divides the flow passage 61.

The duct bottom wall portion 81 is disposed on the arch core holder 46 (holder top wall portion 461) and covers part of the through hole 465. The duct bottom wall portion 81 has a plurality of vent holes 81*a* formed in it. The vent hole 81*a* communicates with the through hole 465. The vent hole 81*a* has a smaller opening area than the through hole 465. Changing the number of vent holes 81*a* disposed above the through hole 465 results in changing the opening area of the through hole 465 covered by the arch core holder 46. In this embodiment, the number of vent holes 81*a* disposed above the through hole 465 increases from 0 to 1 to 2 as one moves from directly below the first opening portions 474 and 476 to the second opening portion 475. Thus, the opening area of the through hole 465 covered by the arch core holder 46 increases from directly below the first opening portions 474 and 476 to the second opening portion 475. In this embodiment, the opening area of each through hole 465 is varied by changing the number of ventilation holes 81*a* with the same shape; instead, it is also possible to change the opening area of the ventilation holes 81*a* according to the opening area of each through hole 465.

This helps reduce the direct inflow into the arch core holder 46 of part of the gas A that has flowed into the inner duct 80 through the first opening portion 474, 476. It is thus possible to suppress excessive cooling of the part of the coil 41 disposed directly below the first opening portions 474 and 476. In this way, it is possible to reduce uneven cooling of the coil 41 in the axial direction (X1-X2) and to cool the coil 41 efficiently and evenly. It is also possible to increase the flow rate of the gas A circulating through the flow passage 61.

Also, in this embodiment, arranging the arch core holder 46 gives the through holes 465 covered by the arch core holder 46 opening areas that increase from directly below the first opening portions 474 and 476 to the second opening portion 475. This helps alleviate the concentration of outside air directly below the first opening portions 474 and 476 and to direct it in the exhausting direction.

Thus, providing the inner dust 80 makes it possible to adjust the circulation direction, flow rate, and the like of the gas A having flowed into the flow passage 61 through the first opening portions 474 and 476. For example, increasing the flow rate of the gas A circulating through the flow passage 61 can be achieved by reducing the number of vent holes 81*a* and thereby reducing the opening area of the through holes 465 covered by the arch core holder 46.

Figure 12:
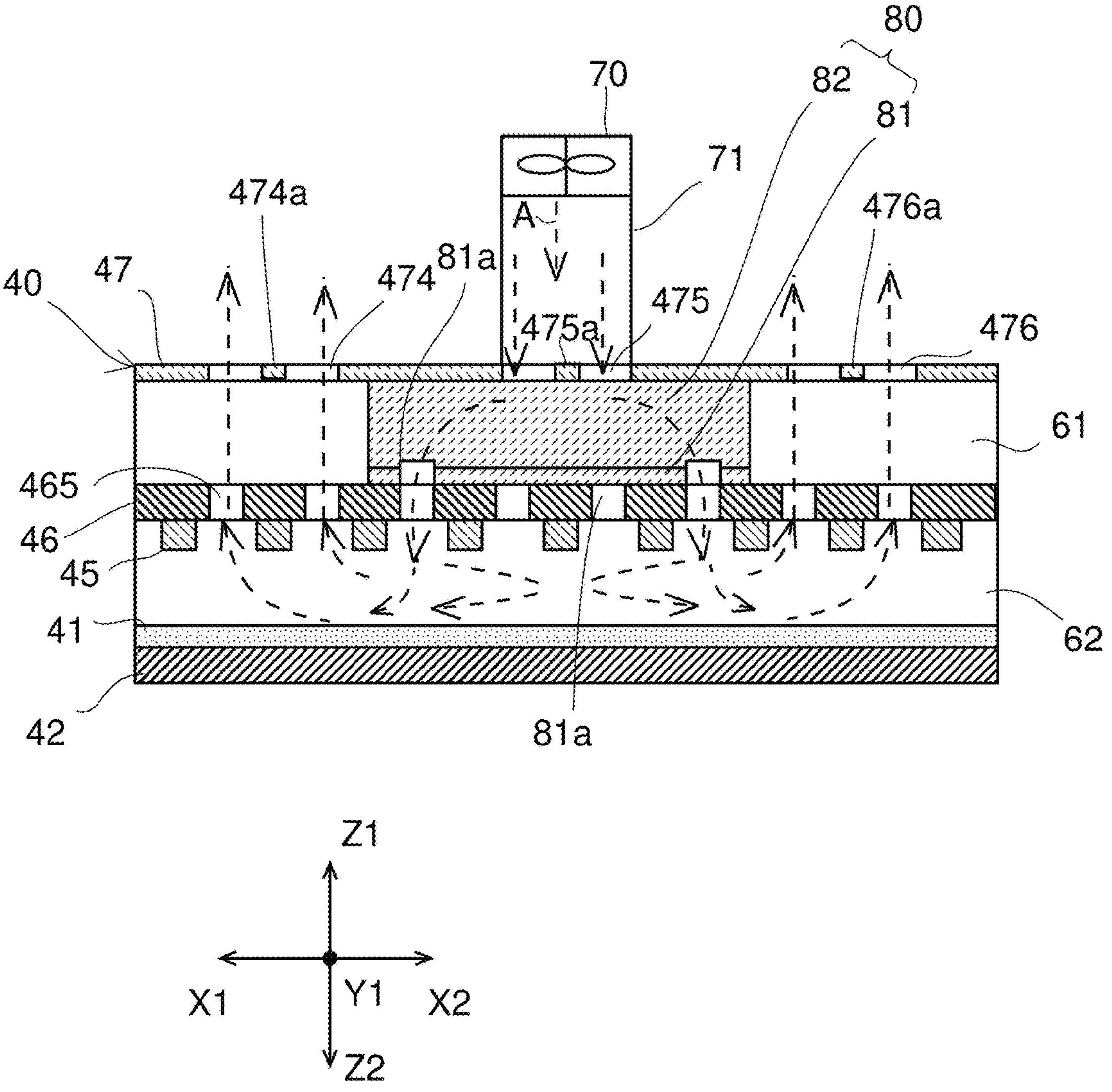
FIG. 12 is an illustrative diagram showing the flow of gas circulating in a heating unit 40 in the fixing device 15 according to a modified example according to the fourth embodiment of the present disclosure.

FIG. 12 is an illustrative diagram showing the flow of gas A circulating in the heating unit 40 according to a modified example. As described in connection with the second embodiment, when the second opening portion 475 functions as an intake port, the inner duct 80 is disposed at one place so as to face the second opening portion 475 in the vertical direction (Y1-Y2). Part of the through hole 465, which is disposed directly below the second opening portion 475, is covered and closed by the duct bottom wall 81. This reduces the direct inflow into the arch core holder 46 of part of the gas A that has flowed through the second opening portion 47 into the inner duct 80 and increases the flow rate of the gas A circulating through the flow passage 61. Providing the inner duct 80 also allows adjustment of the circulation direction, flow rate, and the like of the gas A having flowed into the flow passage 61 through the second opening portion 475.

The embodiments described above are not meant to limit the scope of the present disclosure, which thus allows for any modifications without departure from the spirit of what is disclosed herein. The embodiments described above deal with a monochrome printer as one example of the image forming apparatus 100. However, the present disclosure is applicable not only to monochrome printers but also to various electrophotographic image forming apparatus, such as color printers, monochrome and color copiers, digital multifunction peripherals, and facsimile machines, that transfer a toner image to a sheet (recording medium) and fix the transferred unfixed toner with a fixing device.

In the embodiments, the through holes 465 and 466 are provided in the arch core holder 46; there are however no restrictions on the shape, number, position, etc. of through holes 465 and 466.

In the embodiments, the fixing belt 30 is rotated by the fixing roller; however, the present disclosure imposes no limitation on the rotating mechanism for the fixing belt 30. In the embodiments, the fixing belt 30 faces in the radial direction, and is directly heated by, the heating unit 40 that heats it; however, the present disclosure imposes no limitation to this structure. For example, a sliding belt on which the fixing belt 30 is slid can be provided and the sliding belt can be heated with the heating unit 40 so that the fixing belt 30 can be indirectly heated via the sliding belt.

What is claimed is:

1. A fixing device comprising:

a fixing belt that is endless and that is rotatable along a conveyance direction of a recording medium;

a pressing member that is pressed against a fixing roller across the fixing belt under a predetermined pressure to form a fixing nip portion between the pressing member and the fixing belt; and a heating unit that heats the fixing belt, wherein the heating unit includes:

a coil that extends along an axial direction along which a rotation axis of the fixing roller extends with respect to an axis of rotation of the fixing belt;

a bobbin that is disposed between the coil and the fixing belt, the bobbin holding the coil;

an arch core that covers the coil from outward in a radial direction orthogonal to the rotation axis of the fixing roller and extends in a circumferential direction about the rotation axis of the fixing roller, a plurality of the arch cores being arranged in a row along the axial direction;

an arch core holder that holds the arch cores from outward in the radial direction; and a cover that covers the arch core holder from outward in the radial direction, the cover forming a gas flow passage between the cover and the arch core holder, the gas flow passage extending along the axial direction, the cover has a pair of first opening portions disposed in opposite end parts along the axial direction and a second opening portion disposed in a middle part along the axial direction, the pair of first opening portions and the second opening portion are arranged in a row along the axial direction on a same plane, and an airflow entering the flow passage through one of the first and the second opening portions circulates along the axial direction and is discharged through the other of the first and the second opening portions.

2. The fixing device according to claim 1, further comprising:

a blower that sends gas to inside the cover, wherein the blower communicates with the first or second opening portion via a duct.

3. The fixing device according to claim 1, wherein one of the first and the second opening portions that serves as an intake port for the airflow has a guide portion for adjusting a direction of the airflow, the guide portion is in a form of a plate, the guide portion being inclined, as it extends toward the arch core holder, toward the other of the first and the second opening portions through which the airflow is discharged.

4. The fixing device according to claim 3, wherein the guide portion is formed by bending part of the cover.

5. The fixing unit according to claim 1, wherein the heating unit further includes an inner duct including a partition wall in a form of a plate dividing the flow passage, the partition wall stands upright in the radial direction and extends along the axial direction on a section perpendicular to the axial direction.

6. The fixing device according to claim 5, wherein the arch core holder has a through hole that penetrates through between the arch cores that are adjacent along the axial direction, and the inner duct has a duct bottom wall portion disposed on the arch core holder and covering part of the through hole.

7. An image forming apparatus comprising:

the fixing device according to claim 1; and an image forming portion that forms an image on the recording medium.

8. A fixing device comprising:

a fixing belt that is endless and that is rotatable along a conveyance direction of a recording medium;

a pressing member that forms a fixing nip portion between the pressing member and the fixing belt; and a heating unit that heats the fixing belt, wherein the heating unit includes:

a coil that extends along a direction orthogonal to a conveyance direction of the recording medium;

a bobbin that is disposed between the coil and the fixing belt, the bobbin holding the coil;

an arch core that extends so as to stride over the coil, a plurality of the arch cores being arranged in a row along a longitudinal direction of the coil;

an arch core holder that holds the arch cores from outward; and a cover that covers the arch core holder from outward, the cover forming a gas flow passage between the cover and the arch core holder, the gas flow passage extending along the longitudinal direction of the coil, the cover has a pair of first opening portions disposed in opposite end parts of the coil along the axial direction and a second opening portion disposed in a middle part of the coil along the axial direction, the pair of first opening portions and the second opening portion are arranged in a row along the longitudinal direction of the coil, and an airflow entering the flow passage through one of the first and the second opening portions circulates along the longitudinal direction of the coil and is discharged through the other of the first and the second opening portions.

* * * * *